455-611 AU 233 EX
FIP8106 OR 3,752,992

United States Patent [19] [11] 3,752,992
Fluhr [45] Aug. 14, 1973

[54] OPTICAL COMMUNICATION SYSTEM

[75] Inventor: Frederick R. Fluhr, Oxon Hill, Md.

[73] Assignee: The United States of America as represented by the Secretary of the Navy, Washington, D.C.

[22] Filed: May 28, 1969

[21] Appl. No.: 828,550

[52] U.S. Cl. ............ 250/199, 343/100 CS, 343/200
[51] Int. Cl. ............ H04b 9/00
[58] Field of Search ............ 250/199; 343/100 R, 343/100 PE, 100 CS, 100 S, 5 W, 200, 208; 332/7.51, 25, 58, 59, 60, 140, 156, 157, 158

[56] References Cited

UNITED STATES PATENTS

| | | | |
|---|---|---|---|
| 2,707,749 | 5/1955 | Mueller | 250/199 |
| 3,256,443 | 6/1966 | Moore | 250/199 |
| 3,272,988 | 6/1966 | Bloom et al. | 250/199 |
| 3,284,632 | 11/1966 | Niblack et al. | 250/199 |
| 3,302,028 | 1/1967 | Sterzer | 250/199 |
| 3,383,460 | 5/1968 | Pritchard | 250/199 UX |
| 3,409,369 | 11/1968 | Bickel | 250/199 UX |
| 3,440,424 | 4/1969 | Buhrer | 250/199 |
| 3,233,108 | 2/1966 | Rosenblum | 250/199 |

*Primary Examiner*—Benedict V. Safourek
*Attorney*—Arthur L. Branning and R. S. Sciascia

[57] ABSTRACT

An optical communication system including a device for splitting the output beam from a laser into two quadrature polarized beams, phase modulators for modulating at least one of the two beams, and a combiner for thereafter aligning the two means in a non-interfering manner for transmission along a single path. The system further includes a receiver for receiving and separating the two transmitted beams, a rotator for axially re-aligning the polarized beams, and a combiner for combining the two beams in an interfering manner thereby causing amplitude modulation of the combined beam. The signal information is then removed from the amplitude modulated beam by a detector and fed to any suitable readout device.

2 Claims, 2 Drawing Figures

INVENTOR
FREDERICK R. FLUHR
BY [signature]
ATTORNEY

OPTICAL COMMUNICATION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to communication systems and, more particularly, to an optical communication system which requires no local oscillator at the receiver and is impervious to spurious interference sources such as atmospheric propagation perturbations.

Most communication systems presently in use operate at radio frequencies, and much technology has been developed during recent years in the refinement of such systems. While such systems have served the purpose, they have not provide entirely satisfactory under all conditions of service for the reason that considerable difficulty has been experienced in increasing spatial resolution in the context of secured communications and ranging systems.

Recently, as a direct result of the many major breakthroughs in the development of the laser, optical communication systems utilizing modulated light beams have begun to play a major part in the solution of a number of the aforementioned problems. The fact that the laser produces coherent electromagnetic energy, which can readily be focused, inherently makes it an ideal communication system component. It is pointed out, however, that while the laser theoretically appears to have numerous outstanding characteristics, many basic systems-research efforts have been heretofore unsuccessful in the development of a simple, versatile, and effective optical communication system.

SUMMARY OF THE INVENTION

The present invention overcomes the disadvantages of similarly employed prior art laser systems while retaining all of the advantages thereof. More specifically, the invention eliminates the necessity for a local oscillator, operating at laser light frequencies, and thus obviates the inherent temporal instability problem encountered in systems using two or more laser sources as well as systems using a single laser source where light beam signals generated at different times are compared with each other to thereby extract information. In addition, since the present invention transmits two cross-polarized beams which necessarily undergo identical interference perturbations and of which one is used as a reference signal for the other, spurious interference signals will be cancelled and thus will not adversely affect the desired information signal being transmitted.

The invention can be summarized as an optical communication system including a transmitter which in turn includes a source of coherent electromagnetic energy, a device coupled to the source for splitting the coherent energy into two quadrature polarized beams, a device coupled to the beam splitter for modulating at least one of the two quadrature polarized beams with a modulating signal, and a combining device coupled to the modulator for aligning the two beams in superposition with each other. The system further includes a receiver for receiving the two superposed beams, including a separator for separating the two superposed beams, a polarization rotator coupled to the separator for parallelly orienting the axes of the two separated polarized beams, a beam combining device coupled to the rotator for combing the two parallelly oriented polarized beams with each other to form a single information carrying beam which includes the modulating signal, and a detector coupled to the beam combining device for extracting the information from the modulating signal.

OBJECTS OF THE INVENTION

It is therefore, an object of the present invention to provide a new and improved optical communication system.

It is a further object to provide an optical communication system which is impervious to propagation interference.

The present invention has an additional object in the provision of a simplified optical communication system which does not require a local oscillator.

A still further object of this invention is the provision of a versatile laser beam communication system adapted for use as a radar, an altimeter, a secure point-to-point communication system, or a surface profiler.

These and other objects, advantages and novel features of the invention will become more fully apparent from the following detailed description of the preferred embodiment of the invention when considered in conjunction with the accompanying drawing.

DESCRIPTION OF THE PREFERRED EMBODIMENT

Figure 1:
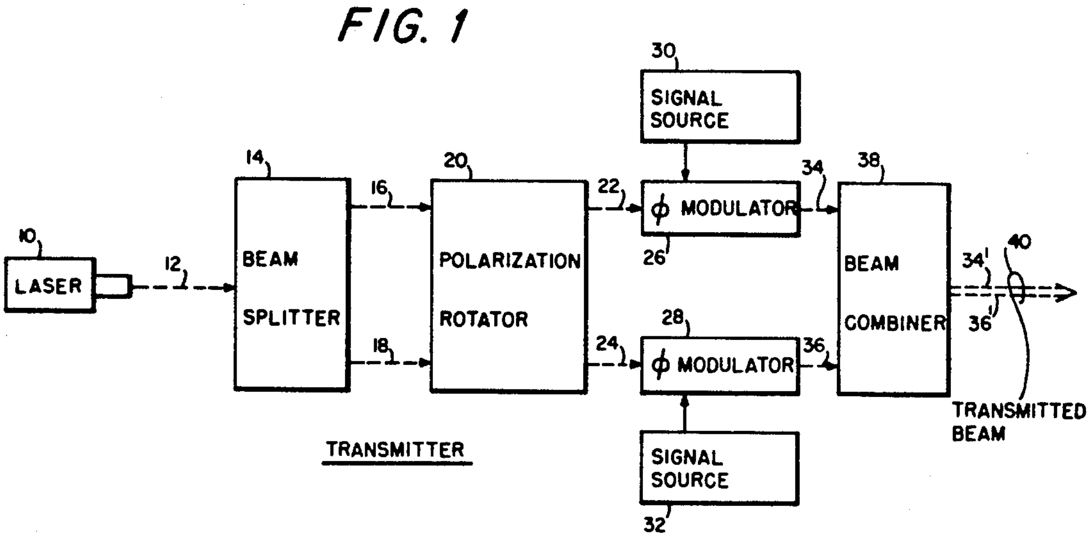
FIG. 1 shows the transmitter portion of the preferred embodiment of the present invention.

Referring now to FIG. 1 of the drawing, there is shown a source of coherent electromagnetic energy 10 which may be a laser device, as illustrated, mounted so as to feed a single coherent light beam 12 to a beam splitter 14. Beam splitter 14 may be any conventional optical splitter such as a birefringent crystal placed at a 45° angle of incidence to the generated beam 12, or the like, depending upon the particular operational characteristics desired. The beam splitter 14 produces two coherent beams 16 and 18 which are fed to a polarization rotator 20. The polarization rotator optically rotates the two beams with respect to each other and produces two quadrature polarized beams 22 and 24 at its output. It should be noted that each beam may be rotated 45° in opposite directions to each other, or one beam may be rotated 90° while the other is unaffected, so long as the resultant output beams 22 and 24 are quadrature polarized.

Beams 22 and 24 are fed to phase modulators 26 and 28, respectively, which are in turn coupled to receive modulating signals from signal sources 30 and 32, respectively. Sources 30 and 32 are schematically representative of any number of various signal sources such as signal generators, computer outputs, radio receiver outputs, etc., having the same or different frequencies. For example, when the device is utilized as a ranging profiler, the signal sources may be fixed frequency signal generators having identical frequencies thus serving as sub-carriers upon which phase shift information indicative of the surface profile of the land or ocean area to be monitored will be impressed. In a second application, as a point-to-point communication system where the transmitter section is physically separated from the receiver section, the signal sources 30 and 32 may represent different or identical audio input information signals where, for example, voice communication is contemplated. It is additionally pointed out that the signals produced by the signal sources need not be unmodulated signals but may be themselves amplitude or frequency modulated signals depending upon the particular application contemplated. In describing the function of modulators 26 and 28, it is emphasized that for many applications, such as the audio communication system described above, only one modulator will be required. In that situation, the other modulator serves not to modulate its respective beam, but merely to introduce a phase delay equal to that produced by the modulator in the other channel so as to maintain phase synchronization throughout the circuit.

The two output beams 34 and 36 from modulators 26 and 28, respectively, are therefore not only quadrature polarized, but at least one of the beams is modulated. Beams 34 and 36 are fed to beam combiner 38 wherein they are superposed and transmitted as a single beam 40. In order to diagrammatically illustrate the fact that while the two beams are superposed and co-exist in the same space after combining by beam combiner 38, their quadrature polarization prevents interference therebetween, the two polarized components have been separated slightly in the drawing and are labelled 34′ and 36′ to show the correspondence between the components of the output signal 40 and their respective input beams 34 and 36.

Thus, the transmitted beam 40 contains two components which are cross-polarized and, being superposed, are subject to identical propagation perturbations. As will become more fully apparent below, one of the components of the composite beam 40 serves as a reference signal for the other in the receiver section to thereby cancel the abovementioned spurious signals.

Figure 2:
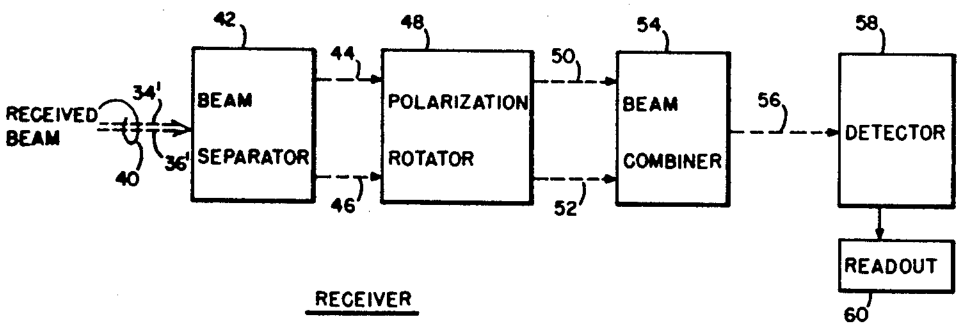
FIG. 2 shows the receiver portion thereof.

Referring now to the receiver section of the optical communcation system shown in FIG. 2, the transmitted beam 40 is received at the receiver by a beam separator 42 which serves to physically separate the two beam components 34′ and 36′ into beams 44 and 46. The beam separator 42 may be any of various units which will separate two cross-polarized beams, such as a thin optical plate oriented at Brewster's angle, or the like. The separated beams 44 and 46 are then fed to a polarization rotator 48 which parallelly aligns the axes of polarization of the beams to produce two separate parallel beams 50 and 52 to be processed in beam combiner 54. The beam combiner superposes the two parallel beams which therefore interfere with each other to produce at the output, as beam 56, a signal containing the carrier frequency components and including the modulating signals impressed by the signal sources 30 and/or 32 of the transmitter section. The combining of the phase modulated beam with the other unmodulated beam causes interference between the two beams thereby amplitude modulating the carrier. In this manner, one of the beams serves as a substitute for the heretofore required local oscillator thus assuring accurate output signals at the receiver regardless of temporal instability changes inherent in general purpose laser devices.

When the system is to be used as a ranging profiler or an altimeter, for example, the transmitter and receiver sections are located at the same point and the transmitted beam is reflected back as the received beam. In that case, the modulating signal itself from signal sources 30 or 32 will be phase modulated by the surface variations of the area to be monitored or the altitude after being transmitted as beam 40. Beam combiner 54 combines the axially aligned beams which interfere causing an amplitude modulation which is proportional to the phase information of the beams 50, 52. This amplitude modulated beam 56 is then fed to detector 58 which extracts the phase information produced by the surface profile and feeds it to a suitable readout device 60 which may be an oscilloscope, a computer, or the like. When the system is used for point-to-point communications, the subcarrier signal on beam 56 is representative of the input modulation generated by sources 30 and 32.

Thus, there is provided an optical communication system which requires no local oscillator to downconvert the received signals, eliminates temporal laser instability problems, and is effectively adaptable to any number of specific applications, some functioning to transmit information from one location to another and others functioning to extract ranging information from a previously transmitted reflected beam.

It should be understood, of course, that the foregoing disclosure relates only to a preferred embodiment of the invention and that numerous modifications or alterations may be made thereto in the light of the above teachings.

What is claimed and desired to be secured by letters patent of the united states is:

1. An optical transmission system comprising:

a source of laser energy;

splitting means coupled to said source of laser energy for splitting the laser light into two laser beams;

polarization rotor means coupled to said splitting means for rotating one of said beams in quadrature relationship with the other;

a first phase modulating means coupled to the polarization rotor means for modulating one of said beams with a reference signal;

a second phase modulating means coupled to said polarization rotor means for modulating the other beam with a modulating signal containing information;

combining means coupled to both of said modulating means for aligning and propagating said two beams in superposition with each other while retaining their quadrature relationship.

2. An optical communication system comprising:

transmitter means including, a source of laser energy;

splitting means coupled to said source of laser energy for splitting the laser light into two laser beams;

polarization rotor means coupled to said splitting means for rotating one of said beams in quadrature relationship with the other;

a first phase modulating means coupled to the polarization rotor means for modulating one of said beams with a reference signal;

a second phase modulating means coupled to said polarization rotor means for modulating the other beam with a modulating signal containing information;

a first combining means coupled to both of said modulating means for aligning and propagating said two beams in superposition with each other while retaining their quadrature relationship;

receiving means including, separator means for separating said two superposed laser beams into two separate received beams while maintaining the quadrature relationship;

rotating means coupled to said separator means for rotating one of said received beams into parallel relationship with the other;

a second combining means coupled to said rotating means for combining said two received beams into one composite beam while maintaining their parallel oriented relationship;

detecting means coupled to said second combining means for extracting the information from said composite beam.

* * * * *